United States Patent

Saruwatari et al.

Patent Number: 5,237,044
Date of Patent: Aug. 17, 1993

[54] POLYIMIDE SHEET AND PREPARATION PROCESS OF THE SHEET

[75] Inventors: Masumi Saruwatari, Nagoya; Shoichi Tsuji, Tanashi; Masami Nakano, Midori; Shinobu Moriya, Nagoya; Masahiro Ohta; Toshiyuki Nakakura, both of Yokohama, all of Japan

[73] Assignee: Mitsui Toatsu Chemicals, Inc., Tokyo, Japan

[21] Appl. No.: 422,895

[22] Filed: Oct. 17, 1989

[30] Foreign Application Priority Data

Oct. 20, 1988 [JP] Japan .................. 63-262712

[51] Int. Cl.$^5$ .................. C08G 69/26; C08G 73/10
[52] U.S. Cl. .................. 528/353; 528/125; 528/126; 528/128; 528/171; 528/172; 528/173; 528/176; 528/183; 528/185; 528/188; 528/220; 528/229
[58] Field of Search ............... 528/173, 171, 125, 172, 528/128, 126, 185, 176, 353, 183, 188, 220, 229

[56] References Cited

U.S. PATENT DOCUMENTS

| | | | |
|---|---|---|---|
| 3,947,402 | 3/1976 | Vollkommer et al. | 428/220 |
| 3,961,009 | 6/1976 | Yoda et al. | 528/481 |
| 4,795,798 | 1/1989 | Tamai et al. | 528/185 |
| 4,847,349 | 7/1989 | Ohta et al. | 528/125 |
| 4,908,409 | 3/1990 | Oikawa et al. | 528/172 |
| 4,971,748 | 4/1990 | Sado | 264/553 |
| 5,087,689 | 2/1992 | Ohta et al. | 528/185 |

FOREIGN PATENT DOCUMENTS

| | | |
|---|---|---|
| 62-68817 | 3/1987 | Japan . |
| 62-205124 | 9/1987 | Japan . |
| 1-180519 | 7/1989 | Japan . |

OTHER PUBLICATIONS

CA 113(24): 213463s, "Polyimide melt extrusion through tapered die in manufacture of film", Tsutsumi, et al, 1990.

Primary Examiner—John Kight, III
Assistant Examiner—P. Hampton-Hightower
Attorney, Agent, or Firm—Burns, Doane, Swecker & Mathis

[57] ABSTRACT

Polyimide sheets having excellent thermal resistance and good surface appearance of the resultant sheets are obtained by a melt-extrusion process from a specific polyimide in the temperature range of 300° C. to 450° C. and a moisture content of 200 ppm or less.

2 Claims, No Drawings

POLYIMIDE SHEET AND PREPARATION PROCESS OF THE SHEET

BACKGROUND OF THE INVENTION

1. Field of the Invention

The present invention relates to a polyimide sheet prepared from a specific polyimide and a preparation process for the polyimide sheet. More particularly, the invention relates to a polyimide sheet prepared from a polyimide which can be processed by melt-extrusion and the process for preparing a polyimide sheet by melt-extrusion.

2. Prior Art of the Invention

Aromatic polyimide has excellent mechanical properties, solvent resistance and electrical insulative properties in addition to the highest thermal resistance among organic polymers. Examples of the aromatic polyimide are a polyimide prepared from bis(4-aminophenyl)ether and pyromellitic dianhydride (KAPTON,VESPEL; a product of E. I. Du Pont de Nemours & Co.) and a polyimide prepared from bis(4-aminophenyl) ether and 3,3',4,4'-biphenyltetracarboxylic dianhydride (UBILEX; a product of Ube Industries Co.).

Since heat-melting is difficult in these polyimides, these polyimides are prepared by initially casting a polyamic acid precursor into a sheet form and subsequently carrying out a heat imidization reaction. The preparation process has a rate-determining stage in the solvent removal step and the imidization step, is poor in productivity and further requires a solvent recovery step. Consequently, the process is economically unfavorable.

As another polyimide, a polyetherimide having thermoplasticity has been developed (ULTEM; a product of General Electric(GE)).

The polyetherimide having thermoplasticity can be used to prepare a sheet by the melt-extrusion process.

However, the sheet obtained by using the polyetherimide is unsatisfactory in view of heat and chemical resistance. Consequently, restrictions have been imposed upon the fields of application.

Another polyimide capable of being melted by heating has been disclosed in Japanese Patent Laid-Open Nos.62-68817 and 62-205124. However, a preparation process of a sheet by melt-extrusion process is not disclosed.

SUMMARY OF THE INVENTION

An object of this invention is to provide a sheet of a specific polyimide which can be processed by melt-extrusion and is also excellent in thermal resistance .

Another object of this invention is to provide a process for the preparation of a polyimide sheet by melt-extrusion.

The present inventors have carried out an intensive investigation in order to achieve the above objects. As a result, it has been found that a polyimide sheet having satisfactory surface appearance, free from bubbles and excellent thermal resistance can be obtained by a melt-extrusion process. Thus the invention has been completed.

One aspect of this invention is a polyimide sheet comprising at least one polyimide having recurring structural units represented by the formula (I):

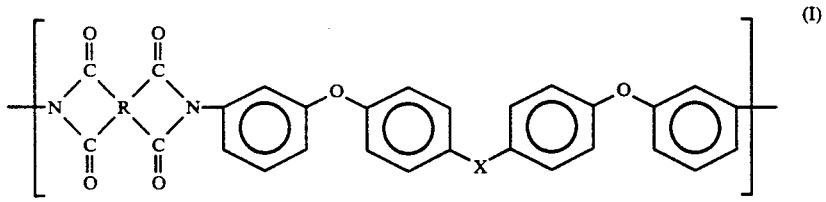

wherein R is tetra-valent radical selected from the group consisting of an aliphatic radical having two or more carbon atoms, a cyclo-aliphatic radical, a monoaromatic radical, a condensed polyaromatic radical and a non-condensed polyaromatic radical wherein the aromatic radicals are mutually connected with a bond or a crosslinking function, X is a divalent radical of a single bond, sulfur atom, sulfonyl radical, carbonyl radical, isopropylidene radical, or hexafluoroisopropylidene radical.

A further aspect of this invention is a process for preparing the polyimide sheet.

R is preferably a tetravalent radical selected from the group consisting of

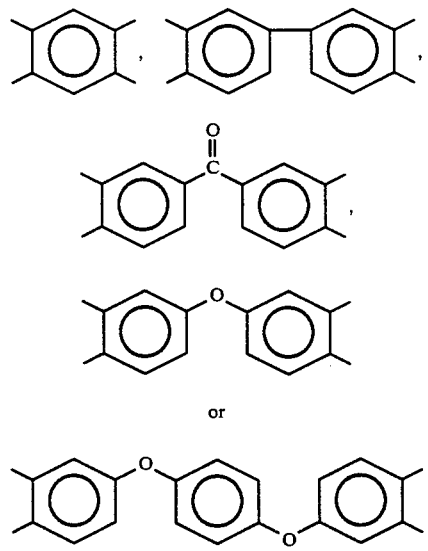

In this invention, the polyimide sheets have excellent thermal resistance and good surface appearance, and bubbles are not generated by producing the sheets from the specific polyimide in a temperature range of 300° C. to 450° C. and controlling the moisture content to 200 ppm or less.

This is, the polyimide sheet can be prepared from the specific polyimide by a melt-extrusion process, and has excellent thermal resistance.

DETAILED DESCRIPTION OF THE INVENTION

Polyimide of this invention can be prepared by conducting a dehydration condensation reaction of an aromatic tetracarboxylic dianhydride with an aromatic diamine.

Exemplary aromatic tetracarboxylic dianhydrides which may be used to prepare the polyimide include, pyromellitic dianhydride, ethanetetracarboxylic dianhydride, butanetetracarboxylic dianhydride, cyclopentanetetracarboxylic dianhydride,
1,2,3,4-benzenetetracarboxylic dianhydride,
2,3,6,7-naphthalenetetracarboxylic dianhydride,
1,4,5,8-naphthalenetetracarboxylic dianhydride,
1,2,5,6-naphthalenetetracarboxylic dianhydride,
3,4,9,10-perylenetetracarboxylic dianhydride,
2,3,6,7-anthracenetetracarboxylic dianhydride
1,2,7,8-phenanthrenetetracarboxylic dianhydride.
3,3',4,4'-biphenyltetracarboxylic dianhydride,
2,2',3,3'-biphenyltetracarboxylic dianhydride,
3,3',4,4'-benzophenonetetracarboxylic dianhydride,
2,2',3,3'-benzophenonetetracarboxylic dianhydride,
2,2-bis(3,4-dicarboxyphenyl)propane dianhydride,
2,2-bis(2,3-dicarboxyphenyl)propane dianhydride,
bis(3,4-dicarboxyphenyl)ether dianhydride,
bis(2,3-dicarboxyphenyl)ether dianhydride,
bis(3,4-dicarboxyphenyl)sulfone dianhydride,
bis(2,3-dicarboxyphenyl)sulfone dianhydride,
2,2-bis(3,4-dicarboxyphenyl)-1,1,1,3,3,3-hexafluoropropane dianhydride,
2,2-bis(3,4-dicarboxyphenyl)-1,1,1,3,3,3-hexachloropropane dianhydride,
1,1-bis(2,3-dicarboxyphenyl)ethane dianhydride,
bis(2,3-dicarboxyphenyl)methane dianhydride,
bis(3,4-dicarboxypenyl)methane dianhydride,
4,4'-(p-phenylenedioxy)diphthalic dianhydride and
4,4'-(m-phenylenedioxy)diphthalic dianhydride.

The preferred aromatic tetracarboxylic dianhydrides used are pyromellitic dianhydride,
3,3',4,4'-biphenyltetracarboxylic dianhydride,
3,3',4,4'-benzophenonetetracarboxylic dianhydride,
bis(3,4-dicarboxyphenyl)ether dianhydride and
4,4'-(p-phenylenedioxy)diphthalic dianhydride.

The aromatic tetracarboxylic dianhydride may be used singly or in combinations of two or more.

Exemplary aromatic diamines suitable for use include
4,4'-bis(3-aminophenoxy)biphenyl,
bis[4-(3-aminophenoxy)phenyl]sulfide,
bis[4-(3-aminophenoxy)phenyl]sulfone,
bis[4-(3-aminophenoxy)phenyl]ketone,
2,2-bis[4-(3-aminophenoxy)phenyl]propane and
2,2-bis[4-(3-aminophenoxy)phenyl]-1,1,1,3,3,3-hexafluoropropane.
These compounds may be used singly or in combination.

Other aromatic diamines may also be used as aromatic diamine ingredients by replacing a part of the above aromatic diamine. The amount of diamine to be replaced is less than 20 % by mole per mole of the total aromatic diamine.

Exemplary other aromatic diamines include,
p-phenylenediamine, m-phenylenediamine, m-aminobenzylamine,
p-aminobenzylamine, 4,4'-diaminobiphenyl, 3,3'-diaminobiphenyl,
3,3'-diaminodiphenyl ether, 4,4'-diaminodiphenyl ether,
4,4'-diaminodiphenyl methane, 3,3'-diaminodiphenyl methane,
1,1-bis(4-aminophenyl)ethane, 1,1-bis(3-aminophenyl)ethane,
2,2-bis(3-aminophenyl)propane, 2,2-bis(4-aminophenyl)propane,
2,2-bis(4-aminophenyl)-1,1,1,3,3,3-hexafluoropropane,
2,2-bis(3-aminophenyl)-1,1,1,3,3,3-hexafluoropropane,
3,3'-diaminodiphenyl sulfide, 4,4'-diaminodiphenyl sulfide,
3,3'-diaminodiphenyl sulfone, 4,4'-diaminodiphenyl sulfone and
3,3'-diaminobenzophenone.

Any of the above aromatic tetracarboxylic acid anhydrides and aromatic diamines may be respectively used as a mixture. In such cases, the resulting polyimide is a mixture of two or more polyimide components having the recurring structural units represented by the formula (I).

The polyimide used in the invention can be prepared usually by suspending or dissolving the aromatic tetracarboxylic dianhydride and the aromatic diamine in an organic solvent and conducting a dehydration condensation reaction chemically or thermally, then separating and purifying by commercial methods to obtain polyimide powder. The reaction of an aromatic tetracarboxylic dianhydride with an aromatic diamine may be also carried out in the absence of the organic solvent.

The polyimide powder can be charged into a processing step as such or after being processed into granules.

In the process, polyimide is heat-melted, extruded into a sheet form through a die such as a circular die or a flat die, and cooled to obtain the sheet.

The polyimide of this invention is stored in the form of a powder or pellets and contains from 0.5 to 1.0% of moisture under usual storage conditions. Such level of moisture content causes no trouble when articles are prepared by injection molding. However, it has been found that the moisture gives adverse effects on the characteristics of the sheet when the sheet is produced by the melt-extrusion process of this invention.

A moisture content of 0.5 to 1% leads to problems particularly on the appearance of the sheet. By controlling the moisture content to 200 ppm or less, the stable production of sheets having excellent surface appearance has been achieved.

Any method may be used for reducing the moisture content to 200 ppm or less. The powder or pellets may generally be kept for 3 to 24 hours at a temperature of 100° C. to the temperature where polyimide does not fuse, usually 250° C. or less. Moisture reduction may also be effectively conducted in a nitrogen atomosphere and/or under reduced pressure.

The melt-extrusion temperature in this invention is different depending upon the polymer structure. The melt-extrusion temperature is usually in the range of 300° to 450° C., preferably in the range of 350° to 430° C. When the temperature is lower than 300° C. polyimide resin cannot be fused and hence extrusion is impossible. On the other hand, when the temperature exceeds 450° C., the polyimide resin tends to decompose and the appearance of the sheet is impaired by generation of bubbles, die lines and decomposition residue.

The present invention will hereinafter be illustrated further in detail by way of examples.

Characteristic values of polyimide indicated in the examples were measured by the following methods.

(1) Glass transition temperature and melting point:

Glass transition temperature (Tg) and melting point (Tm) were measured in accordance with DSC method. Tm was defined as the peak temperature of a fusion curve.

(2) Melt viscosity:

Melt viscosity was measured with a KOKA-model flow tester (SHIMADZU CO.). Apparent viscosity (poise) was calculated at an apparent shear rate of 200 sec$^{-1}$ and temperature of 400° C.

(3) Tensile strength and elongation:

Specimens were cut at 45 degrees to the flow direction of the sheet. Tensile test was carried out at 23° C. and 200° C. Strength and elongation at break were measured in accordance with ASTM D-882.

Polyimide 1

Into a reaction vessel equipped with a stirrer, reflux condenser and nitrogen inlet tube, 368.4 g (1 mole) of 4,4'-bis(3-aminophenoxy)biphenyl and 234.4 g of N,N-dimethylacetamide were charged. To the resulting solution, 218.1 g (1 mole) of pyromellitic dianhydride was added by portions in a nitrogen atmosphere with caution to prevent a temperature rise of the solution. The reaction was continued for about 20 hours with stirring at room temperature. The polyamic acid thus obtained had an inherent viscosity of 3.21 dl/g. To the solution of polyamic acid obtained, 30.3 g (0.3 mole) of triethylamine and 30.6 g (0.3 mole) of acetic anhydride were added over about 30 minutes and successively stirred for about 30 minutes. The reaction solution thus obtained was charged with 2000 g of methanol. The precipitated powder was filtered, washed with methanol and acetone, and then dried at 300° C. for 8 hours in a nitrogen atmosphere. The amount of polyimide powder thus obtained was 517 g. The yield was 94 %. The polyimide obtained was a crystalline resin and had a glass transition temperature of 271° C., melting point of 389° C. and melt viscosity of 5500 poise.

Polyimide 2

The same procedures as described in Polyimide 1 were carried out by using 2,2-bis[4-(3-aminophenoxy)phenyl]-1,1,1,3,3,3-hexafluoropropane and pyromellitic dianhydride. The Polyimide obtained was a crystalline resin and had a glass transition temperature of 247° C., melting point of 385° C. and melt viscosity of 4800 poise.

Polyimides 3-15

The same procedures as described in Polyimide 1 were carried out using various combinations of aromatic tetracarboxylic dianhydrides and aromatic diamines as illustrated in Table 1. Glass transition temperature, melting point and melt viscosity of the polyimides thus obtained are illustrated in Table 1.

EXAMPLE 1

Polyimide Powder 1 was dried at 150° C. for 24 hours. The moisture content of the powder was 150 ppm. The powder was fed through a screw compactor to an extruder having a diameter of 15 mm and L/D ratio of 22, and heat-melted at 420° C. The fused resin was extruded through a T-die having a width of 80 mm at a rate of 215 g/h and allowed to cool. The polyimide sheets thus obtained had a thickness of about 100 μm and were satisfactory in appearance and excellent in thermal resistance. The tensile strength and elongation of these sheets Table 1 are illustrated in Table 2.

EXAMPLE 2

Polyimide powder 2 was dried at 150° C. for 24 hours, fed through a screw compactor to an extruder having a diameter of 15 mm and L/D ratio of 22, and heat-melted at 400° C.

TABLE 1

| Polyimide No. | Aromatic tetracarboxylic dianhydride ingredient | Aromatic diamine ingredient | Glass transition temperature °C. | Melt Viscosity poise |
| --- | --- | --- | --- | --- |
| 3 | pyromellitic dianhydride, | bis[4-(3-aminophenoxy)phenyl] sulfide | 218 | 2800 |
| 4 | 3,3',4,4'-biphenyltetracarboxylic dianhydride, | bis[4-(3-aminophenoxy)phenyl] sulfone | 248 | 4500 |
| 5 | 3,3',4,4'-biphenyltetracarboxylic dianhydride, | bis[4-(3-aminophenoxy)phenyl] ketone, | 229 | 4000 |
| 6 | 3,3',4,4'-biphenyltetracarboxylic dianhydride, | 2,2-bis[4-(3-aminophenoxy) phenyl]propane | 210 | 3000 |
| 7 | 3,3',4,4'-benzophenonetetracarboxylic dianhydride, | bis[4-(3-aminophenoxy)phenyl] sulfone | 238 | 2400 |
| 8 | 3,3',4,4'-benzophenonetetracarboxylic dianhydride, | 2,2-bis[4-(3-aminophenoxy) phenyl]-1,1,1,3,3,3-hexafluoropropane, | 206 | 3400 |
| 9 | 3,3',4,4'-benzophenonetetracarboxylic dianhydride, | 2,2-bis[4-(3-aminophenoxy) phenyl]propane | 207 | 2200 |
| 10 | bis(3,4-dicarboxyphenyl)ether dianhydride, | 4,4'-bis(3-aminophenoxy)biphenyl | 208 | 3900 |
| 11 | bis(3,4-dicarboxyphenyl)ether dianhydride, | bis[4-(3-aminophenoxy)phenyl] ketone | 202 | 2800 |
| 12 | bis(3,4-dicarboxyphenyl)ether dianhydride, | bis[4-(3-aminophenoxy)phenyl] sulfide | 175 | 2000 |
| 13 | 4,4'-(p-phenylenedioxy)diphthalic dianhydride, | bis[4-(3-aminophenoxy)phenyl] sulfone | 209 | 2600 |
| 14 | 4,4'-(p-phenylenedioxy)diphthalic dianhydride, | bis[4-(3-aminophenoxy)phenyl] ketone, | 195 | 2500 |
| 15 | 4,4'-(p-phenylenedioxy)diphthalic dianhydride, | 2,2-bis[4-(3-aminophenoxy) phenyl]propane | 176 | 2300 |

The fused resin was extruded through a nozzle having an internal diameter of 2 mm at a rate of 18.6 g/min. allowed to cool and cut into pellets of about 3 mm in length. The pellets were extruded by the same procedures as described in Example 1. A sheet having a thickness of about 100 μm was obtained at the extrusion temperature of 400° C. The moisture content of polyimide was 200 ppm just before charging the extruder. The sheet was satisfactory in appearance and excellent in thermal resistance. The Physical properties of the sheet are illustrated in Table 2.

COMPARATIVE EXAMPLE 4

Polyimide powder 7 was melt-extruded by the same procedures as described in Example 1 except that extrusion temperature was 290° C. The moisture content of polyimide was 100 ppm just before charging the extruder. However, extrusion could not be carried out.

TABLE 2

| Example or comparative example | Polyimide powder No. | Moisture content (ppm) | Sheet extrusion temperature (°C.) | Extrudability | Surface appearance | Tensile strength (kg/mm²) 23° C. | 200° C. | Elongation (%) 23° C. | 200° C. |
|---|---|---|---|---|---|---|---|---|---|
| Exa. 1 | 1 | 150 | 420 | Good | Good | 10.5 | 4.3 | 123 | 180 |
| Comp. Exa. 1 | 1 | " | 460 | Decomposition | Poor | 5.8 | 2.8 | 43 | 57 |
| Comp. Exa. 2 | 1 | 310 | 400 | Poor | Poor | 6.5 | 3.1 | 53 | 75 |
| Exa. 2 | 2 | 200 | " | Good | Good | 9.8 | 4.5 | 105 | 135 |
| Comp. Exa. 3 | 2 | " | 470 | Decomposition | Poor | 5.4 | 2.5 | 11 | 11 |
| Exa. 3 | 3 | 160 | 360 | Good | Good | 10.1 | 3.2 | 113 | 150 |
| Exa. 4 | 4 | 190 | 380 | " | " | 9.4 | 3.9 | 98 | 183 |
| Exa. 5 | 5 | 150 | 360 | " | " | 8.4 | 3.6 | 113 | 152 |
| Exa. 6 | 6 | 120 | 350 | " | " | 8.3 | 2.5 | 141 | 200 |
| Exa. 7 | 7 | 100 | 340 | " | " | 7.9 | 3.1 | 92 | 154 |
| Comp. Exa. 4 | 7 | " | 290 | impossible | — | — | — | — | — |
| Exa. 8 | 8 | 160 | 360 | Good | Good | 9.8 | 2.0 | 131 | 235 |
| Exa. 9 | 9 | 170 | 350 | " | " | 10.1 | 1.8 | 85 | 193 |
| Exa. 10 | 10 | 140 | " | " | " | 8.5 | 1.9 | 100 | 220 |
| Exa. 11 | 11 | 150 | " | " | " | 8.8 | 1.4 | 93 | 205 |
| Exa. 12 | 12 | 100 | 300 | " | " | 9.4 | 3.5* | 125 | 158* |
| Exa. 13 | 13 | 80 | 350 | " | " | 9.9 | 2.5 | 121 | 198 |
| Exa. 14 | 14 | 50 | " | " | " | 9.2 | 4.1* | 81 | 162* |
| Exa. 15 | 15 | 170 | 300 | " | " | 8.5 | 3.8* | 96 | 118* |

Note;
*measured at 150° C.

EXAMPLES 3-15

Polyimide powder 3-15 were melt-extruded by the same procedures as described in Example 1. Polyimide sheets thus obtained were satisfactory in appearance and excellent in thermal resistance. Extrusion conditions and properties of sheets are illustrated in Table 2.

COMPARATIVE EXAMPLE 1

Polyimide powder 1 was melt-extruded by the same procedures as described in Example 1 except that the extrusion temperature was 460° C. The moisture content of polyimide was 150 ppm just before charging the extruder. Extrusion could be carried out. However, bubbles and residual foreign matter were generated in the resultant sheet due to decomposition of the resin. The surface of the sheet was hence extremely poor.

COMPARATIVE EXAMPLE 2

Polyimide powder 1 was melt-extruded by the same procedures as described in Example 1 except that the extrusion temperature was 400° C. The moisture content of the polyimide was 310 ppm just before charging the extruder. Extrusion could be carried out. However, bubbles were generated in the resultant sheet. The surface of the sheet was hence extremely poor.

COMPARATIVE EXAMPLE 3

Polyimide powder 2 was melt-extruded by the same procedures as described in Example 2 except that the extrusion temperature was 470° C. The moisture content of polyimide was 200 ppm just before charging the extruder. Extrusion could be carried out. However, bubbles and residual foreign matter were generated in the resultant sheet due to decomposition of the resin. Surface of the sheet was hence extremely poor.

What is claimed is:

1. A process for preparing polyimide sheet comprising heat melting at least one polyimide having recurring structural unit represented by the formula (I)

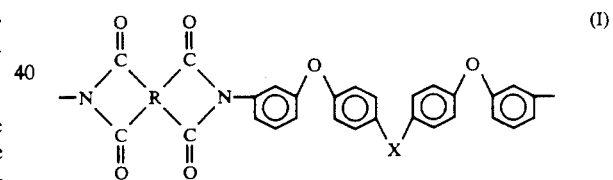

wherein R is a tetravalent radial selected from the group consisting of an aliphatic radical having two or more carbon atoms, a cyclo-aliphatic radial, a monoaromatic radical, a condensed polyaromatic radial and an non-condensed polyaromatic radical wherein the aromatic radicals are mutually connected with a bond or a crosslinking function, X is a divalent radical of a single bond, sulfur atom, sulfonyl radical, carbonyl radical, isopropylidene radical or hexafluoroisopropylidene radical, wherein the moisture content of said polyimide is controlled to 200 ppm or less, in a temperature range of 300° C. to 450° C. in a melt-extrusion process in the absence of an organic solvent and cooling the extruded sheet.

2. The process for preparing the polyimide sheet of claim 1 wherein R in formula (I) is a tetravalent radical of

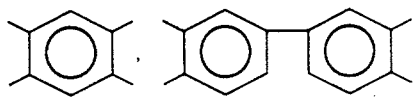

-continued
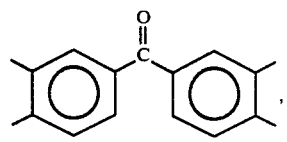
-continued
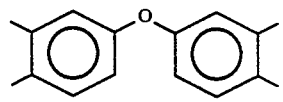
or
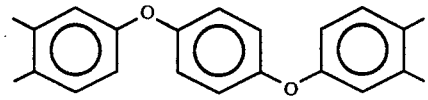
* * * * *

UNITED STATES PATENT AND TRADEMARK OFFICE
CERTIFICATE OF CORRECTION

PATENT NO.  : 5,237,044
DATED       : August 17, 1993
INVENTOR(S) : Saruwatari et al It is certified that error appears in the above-identified patent and that said Letters Patent is hereby corrected as shown below:

Column 1, line 34, amend "UBILEX" to --UPILEX--.
Column 8, claim 1, line 36, "unit" should be --units--;
                   line 46, "radial" should be --radical--;
                   line 49, "an" should be --a--.

Signed and Sealed this

Third Day of May, 1994

Attest:

BRUCE LEHMAN

*Attesting Officer*   *Commissioner of Patents and Trademarks*